3,749,759
Patented July 31, 1973

3,749,759
READILY-SOLUBLE, SOLID, WATER-CONTAINING ALKALI METAL SILICATES AND PROCESS
Helmut V. Freyhold, 2 Salierplatz, 4000 Dusseldorf-Oberkassel, Germany, and Volker Wehle, 57 Beethovenstrasse, 4010 Hilden, Germany
No Drawing. Filed Apr. 20, 1971, Ser. No. 135,791
Claims priority, application Germany, Apr. 29, 1970, P 20 21 004.2
Int. Cl. C01b *33/32;* C11d *3/08*
U.S. Cl. 423—332      10 Claims

ABSTRACT OF THE DISCLOSURE

Readily-soluble, solid, water-containing alkali metal silicates selected from the group consisting of sodium silicate and potassium silicate, having a $SiO_2$ to alkali metal oxide ratio of from 2 to 4:1 and containing from 50% to 70% by weight $SiO_2$, 11 to 20% by weight of water and 0.2% to 10% by weight of water-soluble quaternary nitrogen compounds having from 4 to 24 carbon atoms per nitrogen atom, as well as the process of preparing said readily-soluble, solid, water-containing alkali metal silicates by adding from 0.1% to 5% by weight of said water-soluble quaternary nitrogen compounds to an aqueous alkali metal silicate solution containing from 20% to 37% by weight of $SiO_2$ and drying the resultant solution to a water content of from 11% to 20% by weight.

THE PRIOR ART

It is known to convert alkali metal silicate solutions by a drying process to powdery products. The drying is carried out in practice on rolls or by spraying. The products thus obtained have generally a residual water content of about 14% to 20% by weight.

The advantage of such solid alkali metal silicates lies in the low water ballast and in the relatively low reactivity toward possibly added components. A disadvantage of these products lies in their low rate of solution. This rate of solution is lower when the ratio of $SiO_2$ to alkali metal oxide is higher and when the water content was reduced the most.

It has, therefore, already been attempted to improve the rate of solution of dried alkali metal silicates by an increased residual water content or by addition of substances, such as polyglycols, which promote the re-absorption of water. Such products, however, tend to cake or have increased hygroscopicity due to their higher water content.

OBJECTS OF THE INVENTION

An object of the invention is the obtaining of a readily-soluble, solid, water-containing alkali metal silicate which has a high rate of solution in water.

Another object of the invention is the obtaining of readily-soluble, solid, water-containing alkali metal silicates selected from the group consisting of sodium silicate and potassium silicate, having a $SiO_2$ to alkali metal oxide ratio of from 2 to 4:1 and containing from 50% to 70% by weight $SiO_2$, 11 to 20% by weight of water and 0.2% to 10% by weight of water-soluble quaternary nitrogen compounds having from 4 to 24 carbon atoms per nitrogen atoms.

A yet further object of the invention is the development of a process for the production of a readily-soluble, solid, water-containing alkali metal silicate which consists essentially of drying an aqueous solution of an alkali metal silicate selected from the group consisting of sodium silicate and potassium silicate, said aqueous solution of an alkali metal silicate having a content of from 20% to 37% by weight of SiO and a $SiO_2$ to alkali metal oxide ratio of from 2 to 4:1 and from 0.1% to 5% by weight, based on said aqueous solution of an alkali metal silicate, of a water-soluble quaternary nitrogen compound having from 4 to 24 carbon atoms per nitrogen atom, to a residual water content of from 11% to 20% by weight and recovering said readily-soluble, solid, water-containing alkali metal silicate.

These and other objects of the invention will become more apparent as the description thereof proceeds.

DESCRIPTION OF THE INVENTION

The disadvantages of the prior art can be avoided and the above objects can be achieved if the following described process for the preparation of solid, water-containing alkali metal silicates by drying of sodium or potassium silicate solutions is used. The novel process is characterized in that water-soluble mono and/or polyquaternary nitrogen compounds, in amounts of from 0.1% to 5% by weight, are added to the alkali metal solutions and the water content is reduced in a known manner to from 11% to 20% by weight.

The products obtained are readily-soluble, solid, water-containing alkali metal silicates selected from the group consisting of sodium silicate and potassium silicate, having a $SiO_2$ to alkali metal oxide ratio of from 2 to 4:1 and containing from 50% to 70% by weight $SiO_2$, 11 to 20% by weight of water and 0.2% to 10% by weight of water-soluble quaternary nitrogen compounds having from 4 to 24 carbon atoms per nitrogen atom.

Preferably, the quaternary nitrogen compounds are those water-soluble compounds which contain in the molecule from 4 to 24 carbon atoms per nitrogen atom.

Among these compounds are those of the formulae

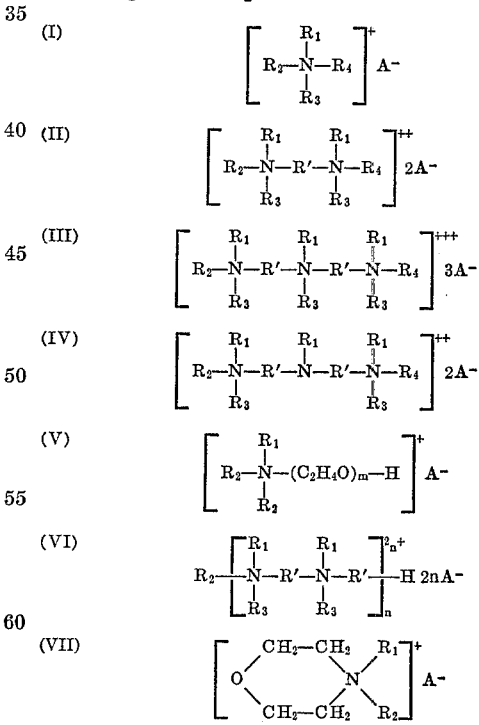

wherein $R_1$, $R_2$, $R_3$ and $R_4$ are members selected from the group consisting of alkyl having from 1 to 12 carbon atoms and alkylol having from 1 to 4 carbon atoms; $R'$ is alkylene having from 2 to 12 carbon atoms; $n$ is an interger from 20 to 100; $m$ is an integer from 2 to 10; and A represents a member selected from the group consisting of hydroxyl and the acyl of a strong mineral acid;

with the proviso that from 4 to 24 carbon atoms are present per nitrogen atom in the molecule.

Specifically as mono and/or polyquaternary nitrogen compounds are especially the following compounds of Table I.

TABLE I

| No. | Compound |
|---|---|
| 1 | $N(CH_3)_4 OH$ |
| 2 | $N(CH_2OH)_4 OH$ |
| 3 | $N(C_2H_4OH)_4 OH$ |
| 4 | $N(C_6H_{13})_4 OH$ |
| 5 | $(CH_3)_2N(C_{10}H_{21})_2 OH$ |
| 6 | $(CH_3)_3N(C_{12}H_{25}) OH$ |
| 7 | $(CH_3)N(C_2H_4OH)_3 OH$ |
| 8 | $(C_2H_5)_2N(C_2H_4OH)_2 OH$ |
| 9 | $(CH_3)_3N(CH_2)_6N(CH_3)_3 (OH)_2$ |
| 10 | $(CH_3)_3N(CH_2)_{12}N(CH_3)_3 (OH)_2$ |

11. $$\left[ HO-\underset{CH_3}{\underset{|}{CH}}-CH_2-\underset{CH_3}{\underset{|}{N}}-(CH_2)_n-\underset{CH_3}{\underset{|}{N}}-CH_2-\underset{CH_3}{\underset{|}{CH}}-OH \right](OH)_2$$
$n=2-5$ 12. $$\left[ (CH_3)_3N-(CH_2)_2\underset{\underset{CH_3}{|}}{\overset{\overset{CH_3}{|}}{N}}-(CH_2)_2-N(CH_3)_3 \right](OH)_3$$

13. $$\left[ -\underset{CH_3}{\underset{|}{\overset{\overset{CH_3}{|}}{N}}}-(CH_2)_{10}-\underset{CH_3}{\underset{|}{\overset{\overset{CH_3}{|}}{N}}}-(CH_2)_{12}- \right]_n (OH)_{2n}$$
$n=20-100$ 14. $$\left[ C_6H_{13}-\underset{CH_3}{\underset{|}{\overset{\overset{CH_3}{|}}{N}}}-(C_2H_4O)_5-H \right]OH$$

15. $$\left[ (CH_3)_3N-(CH_2)_2-\underset{\underset{CH_3}{|}}{N}-(CH_2)_2N(CH_3)_3 \right](OH)_2$$

16. $$\left[ \begin{array}{c} CH_2-CH_2 \\ O \\ CH_2-CH_2 \end{array} \begin{array}{c} CH_3 \\ H \\ C_{12}H_{25} \end{array} \right] OH$$

Instead of the listed hydroxides, which are preferably used, the corresponding water-soluble salts of the quaternary nitrogen compounds with strong mineral acids, particularly the chlorides, sulfates and nitrates, may be used.

Preferably such quaternary nitrogen compounds are used which contain several alkyl groups bound to the nitrogen atom. The water-soluble mono and/or polyquaternary nitrogen compounds with alkyl chains of from 1 to 8, preferably 1 to 4 carbon atoms, have been found particularly effective.

The quaternary nitrogen compounds are added to the alkali metal silicate solutions in amounts from 0.1% to 5%, preferably from 0.4% to 3%, by weight, based on the alkali metal silicate solutions. If desired, the addition can also be effected in the form of solutions. The quantative amount refers always to the content of quaternary nitrogen compound. Conventional sodium or potassium silicate solutions are used as alkali metal silicate solutions whose molar ratio of $SiO_2$ to alkali metal oxide is from 2 to 4:1, preferably 3.2 to 4:1, and whose concentration of $SiO_2$ is from 20% to 37%, preferably from 20% to 30%, by weight.

After the quaternary nitrogen compounds have been added to the alkali metal silicate solutions, the water content is reduced to the desired range of 11% to 20%, preferably from 11% to 16%, by weight, relative to the final product. This is done in a known manner by drying. Specially roll drying, but preferably spray drying is considered.

The spray drying is generally carried out in spraying towers, at temperatures above 100° C., preferably between 120° and 150° C.

In applying the described process, readily-soluble, water-containing alkali metal silicates are obtained whose hygroscopicity and tendency to caking is markedly improved in comparison to similar products with no addition of quaternary nitrogen compounds. If desired, the residual water content may be reduced below the customary amount of 14% to about 11%. Also in this case, products with a technically usable solubility are still obtained.

The alkali metal silicates, preparable in the described way, can be utilized in alkaline cleaning agents, particularly in industrial cleaners, or as adhesives.

The following examples are illustrative of the practice of the invention without being deemed limitative in any respect.

EXAMPLES

Alkali metal silicate solutions with a composition listed in the following Tables II and III were combined with quaternary nitrogen compounds, whose amount is also stated in the tables and subsequently, in a spraying tower, spray-dried at 120° C. The respective water content of the final product as well as the rate of solubility at a temperature of about 20° C. are also given in the right hand part of the tables. The amounts are always in percent by weight.

Table II gives the results obtained with sodium silicates, while in Table III the results with potassium silicates are listed.

As quaternary nitrogen compounds, according to Table II, in Examples 1 and 2, tetraethylammonium hydroxide was used, in Example 4 the corresponding tetraethylammonium chloride was used.

In the examples, according to Table II in Example 6, tetraethylammonium hydroxide was used, and in Example 8 the compound of the following composition was used:

$$\left[ HO-\underset{CH_3}{\underset{|}{CH}}-CH_2-\underset{CH_3}{\underset{|}{N}}-(CH_2)_6-\underset{CH_3}{\underset{|}{N}}-CH_2-\underset{CH_3}{\underset{|}{CH}}-OH \right](OH)_2$$

The numerical data clearly show that the solubility of the products dried without addition of quaternary nitrogen compounds is substantially worse.

TABLE II.—SODIUM SILICATE

| | Concentration of the alkali metal silicate solution | | | Amount of quaternary compound, percent | Dried product | | Rate of solubility, percent of SiO₂ dissolved after— | | |
|---|---|---|---|---|---|---|---|---|---|
| | Percent SiO₂ | Percent Na₂O | Mole ratio SiO₂ to 1 mole Na₂O | | Percent SiO₂ | Percent H₂O | 60 min. | 90 min. | 120 min. |
| 1 | 29.01 | 8.73 | 3.47 | 2 | 67.5 | 12.5 | 80.4 | 95.5 | 100.0 |
| 2 | 29.01 | 8.73 | 3.47 | 1 | 68.0 | 12.0 | 13.0 | 60.8 | 76.0 |
| 3 | 29.01 | 8.73 | 3.47 | 0 | 68.0 | 12.0 | 6.1 | 7.6 | 10.5 |
| 4 | 22.1 | 5.83 | 3.90 | 2 | 64.0 | 13.5 | 15.5 | | 28.5 |
| 5 | 22.1 | 5.83 | 3.90 | 0 | 61.0 | 14.5 | 6.4 | | 7.4 |

TABLE III.—POTASSIUM SILICATE

| | Concentration of the alkali metal silicate solution | | | Amount of quaternary compound, percent | Dried product | | Rate of solubility, percent of SiO₂ dissolved after— | | | |
|---|---|---|---|---|---|---|---|---|---|---|
| | Percent SiO₂ | Percent K₂O | Mole ratio SiO₂ to 1 mole K₂O | | Percent SiO₂ | Percent H₂O | 5 min. | 10 min. | 30 min. | 60 min. |
| 6 | 26.1 | 12.57 | 3.26 | 0.5 | 59.3 | 12.7 | 91.5 | 97.4 | 100.0 | |
| 7 | 26.1 | 12.57 | 3.26 | 0 | 59.0 | 13.0 | 31.0 | 62.0 | 95.0 | 100.0 |
| 8 | 20.4 | 8.04 | 3.99 | 2.0 | 53.0 | 15.5 | 27.5 | 57.0 | 100.0 | |
| 9 | 20.4 | 8.04 | 3.99 | 0 | 54.0 | 15.0 | 7.0 | 13.5 | 38.0 | 88.5 |

If, instead of the nitrogen compounds used in the Tables II and III, such compounds as are listed in Table I are applied in equivalent amounts, in all cases also an important improvement of the rate of solubility relative to the same products without this addition is achieved.

Practically the same results were also obtained if in each case instead of the quaternary nitrogen compounds in the form of the hydroxides the corresponding salts, namely the chlorides, sulfates and nitrates, are used.

The preceding specific embodiments are illustrative of the practice of the invention. It is to be understood, however, that other expedients known to those skilled in the art can be employed without departing from the spirit of the invention or the scope of the appended claims.

We claim:

1. Readily-soluble, solid, water-containing alkali metal silicates selected from the group consisting of sodium silicate and potassium silicate, having a $SiO_2$ to alkali metal oxide ratio of from 2 to 4:1 and containing from 50% to 70% by weight $SiO_2$, 11 to 20% by weight of water and 0.2% to 10% by weight of water-soluble quaternary nitrogen compounds having from 4 to 24 carbon atoms per nitrogen atom selected from the group consisting of compounds of the formulae

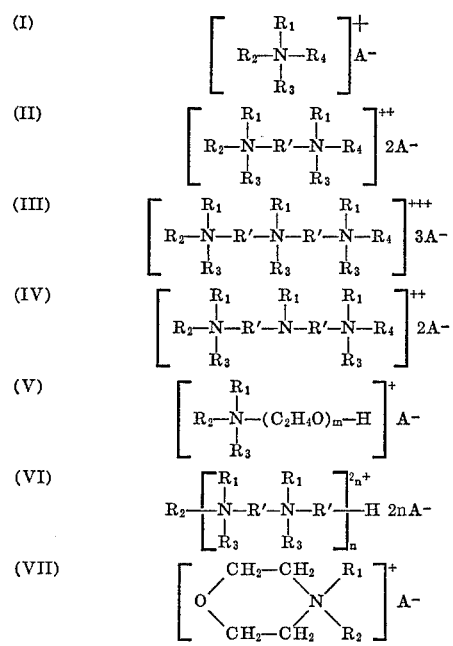

wherein $R_1$, $R_2$, $R_3$ and $R_4$ are members selected from the group consisting of alkyl having from 1 to 12 carbon atoms and alkylol having from 1 to 4 carbon atoms; $R'$ is alkylene having from 2 to 12 carbon atoms; $n$ is an integer from 20 to 100; $m$ is an integer from 2 to 10; and A represents a member selected from the group consisting of hydroxyl and the anion of a strong mineral acid.

2. The alkali metal silicates of claim 1 wherein said $SiO_2$ to alkali metal oxide ratio is from 3.2 to 4:1.

3. The alkali metal silicates of claim 1 wherein said water content is from 11% to 16%.

4. The alkali metal silicates of claim 1 wherein said water-soluble quaternary nitrogen compound content is from 1% to 6% by weight.

5. A process for the production of a readily-soluble, solid, water-containing alkali metal silicate which consists essentially of drying an aqueous solution of an alkali metal silicate selected from the group consisting of sodium silicate and potassium silicate, said aqueous solution of an alkali metal silicate having a content of from 20% to 37% by weight of $SiO_2$ and a $SiO_2$ to alkali metal oxide ratio of from 2 to 4:1 and from 0.1% to 5% by weight, based on said aqueous solution of an alkali metal silicate, of a water-soluble quaternary nitrogen compound having from 4 to 24 carbon atoms per nitrogen atom selected from the group consisting of compounds of the formulae

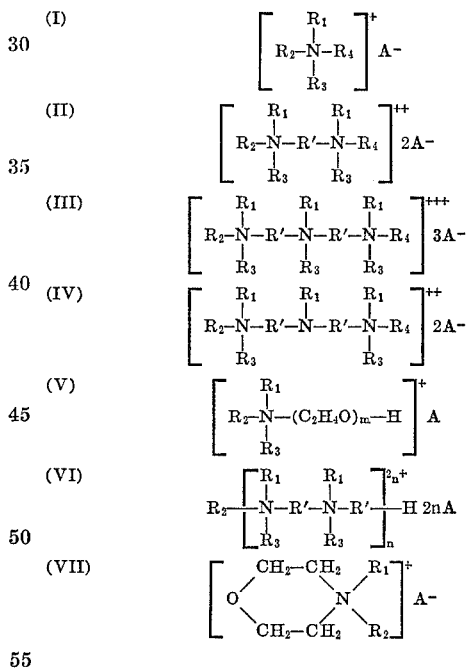

wherein $R_1$, $R_2$, $R_3$ and $R_4$ are members selected from the group consisting of alkyl having from 1 to 12 carbon atoms and alkylol having from 1 to 4 carbon atoms; $R'$ is alkylene having from 2 to 12 carbon atoms; $n$ is an integer from 20 to 100; $m$ is an integer from 2 to 10; and A represents a member selected from the group consisting of hydroxyl and the anion of a strong mineral acid; to a residual water content of from 11% to 20% by weight and recovering said readily-soluble, solid, water-containing alkali metal silicate.

6. The process of claim 5 wherein said $SiO_2$ to alkali metal oxide ratio is from 3.2 to 4:1.

7. The process of claim 5 wherein said residual water content is from 11% to 16%.

8. The process of claim 5 wherein said aqueous solution of an alkali metal silicate has a content of from 20% to 30% of $SiO_2$.

9. The process of claim 5 wherein said quaternary nitrogen compound is present in an amount of from 0.4% to 3% by weight, based on said aqueous solution of an alkali metal silicate.

10. The process of claim 5 wherein A is hydroxyl.

References Cited

UNITED STATES PATENTS

| | | | |
|---|---|---|---|
| 3,383,386 | 5/1968 | Weldes | 252—528 X |
| 3,360,470 | 12/1967 | Wixon | 252—528 X |
| 2,593,652 | 4/1952 | Blanchard | 23—110 |
| 3,475,185 | 10/1969 | Freyhold | 106—74 |
| 3,625,722 | 12/1971 | Freyhold et al. | 106—74 |

HERBERT B. GUYNN, Primary Examiner

U.S. Cl. X.R.

106—74; 252—524, 528, 363.5

UNITED STATES PATENT OFFICE
CERTIFICATE OF CORRECTION

Patent No. 3,749,759                              Dated July 31, 1973

Inventor(s) HELMUT V. FREYHOLD and VOLKER WEHLE

It is certified that error appears in the above-identified patent and that said Letters Patent are hereby corrected as shown below:

Col. 1 after line 7, insert --Assignee HENKEL & Cie., GmbH Dusseldorf-Holthausen, Germany--

| Col. | Line | Page | Line | |
|---|---|---|---|---|
| 2 | 1 | 3 | 3 | "SiO" should be --$SiO_2$-- |
| 3 | Table I No. 16 | 6 | | 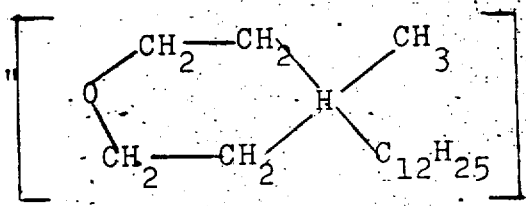 should be 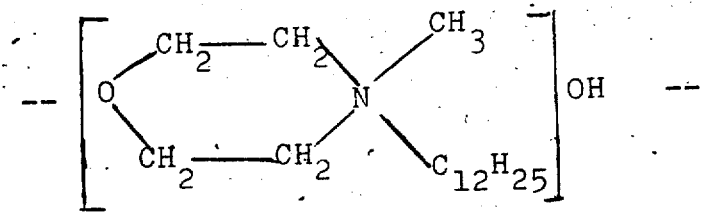 |
| 4 | 50 | 9 | 8 | "Table II" should be --Table III-- |

IN THE CLAIMS

Claim 5  Formula 5   "$[R_2-\underset{R_3}{\overset{R_1}{N}}-(C_2H_4O)_m-H]^+A$." should be --$[R_2-\underset{R_3}{\overset{R_1}{N}}-(C_2H_4O)_m-H]^+A^-$--

UNITED STATES PATENT OFFICE
CERTIFICATE OF CORRECTION

Page 2

Patent No. 3,749,759  Dated July 31, 1973

Inventor(s) HELMUT V. FREYHOLD and VOLKER WEHLE

It is certified that error appears in the above-identified patent and that said Letters Patent are hereby corrected as shown below:

Claim 5 Formula 6 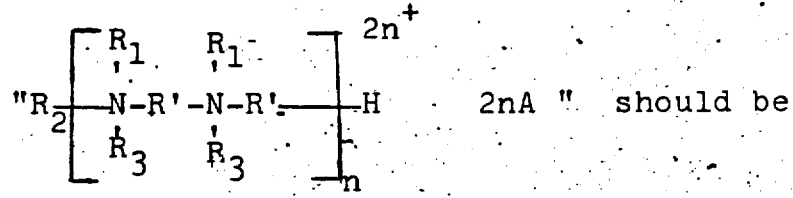 should be

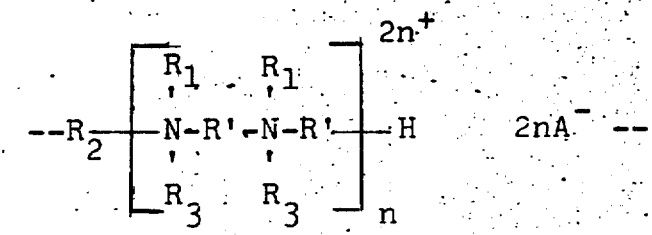

Signed and sealed this 10th day of September 1974.

(SEAL)
Attest:

McCOY M. GIBSON, JR.  C. MARSHALL DANN
Attesting Officer  Commissioner of Patents